(12) United States Patent
Jang et al.

(10) Patent No.: US 9,124,858 B2
(45) Date of Patent: Sep. 1, 2015

(54) CONTENT PROCESSING APPARATUS FOR PROCESSING HIGH RESOLUTION CONTENT AND CONTENT PROCESSING METHOD THEREOF

(71) Applicants: SAMSUNG ELECTRONICS CO., LTD., Suwon-si (KR); Gangneung-wonju National University Industry Academy Cooperation Group, Gangneung-si (KR)

(72) Inventors: Yong-seok Jang, Hwaseong-si (KR); Sung-wook Park, Gangneung-si (KR); Tae-yun Chung, Gangneung-si (KR); Min-seok Kim, Suwon-si (KR); Bong-gil Bak, Suwon-si (KR); Hong-seok Park, Anyang-si (KR); Jong-ho Yang, Yongin-si (KR); Jae-jun Lee, Suwon-si (KR)

(73) Assignees: SAMSUNG ELECTRONICS CO., LTD., Suwon-si (KR); Gangneung-wonju National University Industry Academy Cooperation Group, Gangneung-si (KR)

( * ) Notice: Subject to any disclaimer, the term of this patent is extended or adjusted under 35 U.S.C. 154(b) by 45 days.

(21) Appl. No.: 13/920,928

(22) Filed: Jun. 18, 2013

(65) Prior Publication Data
US 2014/0099066 A1  Apr. 10, 2014

(30) Foreign Application Priority Data

Oct. 5, 2012  (KR) ........................ 10-2012-0110910

(51) Int. Cl.
*H04N 5/77*  (2006.01)
*H04N 9/87*  (2006.01)
(Continued)

(52) U.S. Cl.
CPC ................. *H04N 9/87* (2013.01); *G09G 5/006* (2013.01); *G09G 5/363* (2013.01); *G09G 5/391* (2013.01);
(Continued)

(58) Field of Classification Search
USPC ......................................................... 386/230
See application file for complete search history.

(56) References Cited

U.S. PATENT DOCUMENTS

2004/0212843 A1\* 10/2004 Kodama et al. .......... 358/426.01
2006/0103665 A1    5/2006 Opala et al.
(Continued)

FOREIGN PATENT DOCUMENTS

JP       2004-120341 A    4/2004
KR   10-2006-0077443 A    7/2006
(Continued)

OTHER PUBLICATIONS

Search Report dated Aug. 1, 2013, issued by the European Patent Office in counterpart European Application No. 13167745.2.
(Continued)

*Primary Examiner* — Hung Dang
*Assistant Examiner* — Girumsew Wendmagegn
(74) *Attorney, Agent, or Firm* — Sughrue Mion, PLLC

(57) ABSTRACT

A content processing apparatus is provided, which includes an inputter configured to receive an input of high resolution content, a data processor configured to generate video frames by processing the high resolution content, and a controller configured to control the data processor to configure an object that corresponds to the high resolution content as an object for low resolution and to add the object to the video frame if an output resolution of a display panel to display the video frames is a low resolution.

20 Claims, 14 Drawing Sheets

(51) Int. Cl.
　　　*G09G 5/00*　　　(2006.01)
　　　*G09G 5/36*　　　(2006.01)
　　　*G09G 5/391*　　(2006.01)
　　　*H04N 19/172*　(2014.01)
　　　*H04N 19/132*　(2014.01)
　　　*H04N 19/156*　(2014.01)
　　　*H04N 19/44*　　(2014.01)
　　　*H04N 19/167*　(2014.01)

(52) U.S. Cl.
　　　CPC .. *G09G 2340/045* (2013.01); *G09G 2340/0407* (2013.01); *G09G 2370/042* (2013.01); *G09G 2370/047* (2013.01); *H04N 19/132* (2014.11); *H04N 19/156* (2014.11); *H04N 19/167* (2014.11); *H04N 19/172* (2014.11); *H04N 19/44* (2014.11)

(56) References Cited

U.S. PATENT DOCUMENTS

| 2006/0139371 | A1  | 6/2006  | Lavine et al. |        |
|---|---|---|---|---|
| 2008/0259011 | A1* | 10/2008 | Hayashi | 345/87 |
| 2009/0022412 | A1* | 1/2009  | Okada | 382/240 |
| 2009/0167948 | A1  | 7/2009  | Berman et al. |  |
| 2010/0246954 | A1  | 9/2010  | Kim et al. |  |
| 2011/0051808 | A1  | 3/2011  | Quast et al. |  |
| 2012/0011194 | A1  | 1/2012  | Tahan |  |
| 2013/0063656 | A1* | 3/2013  | Lee et al. | 348/441 |

FOREIGN PATENT DOCUMENTS

| KR | 10-2010-0026361 A | 3/2010 |
|---|---|---|
| KR | 10-2011-0072846 A | 6/2011 |

OTHER PUBLICATIONS

Search Report dated Sep. 27, 2013, issued by the International Searching Authority in counterpart International Application No. PCT/KR2013/004097.

Written Opinion dated Sep. 27, 2013, issued by the International Searching Authority in counterpart International Application No. PCT/KR2013/004097.

* cited by examiner a picture consists of coding tree blocks

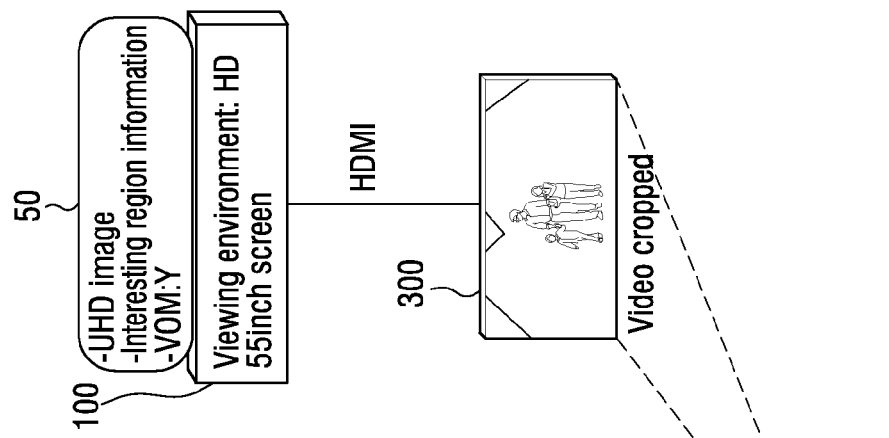
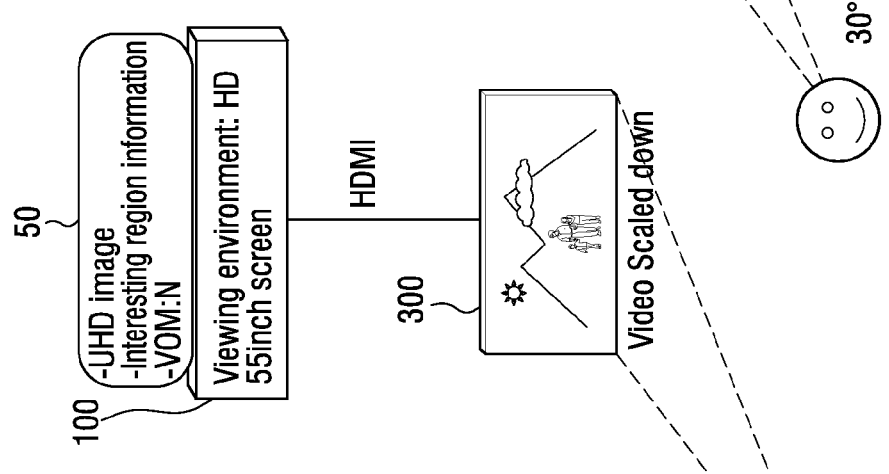
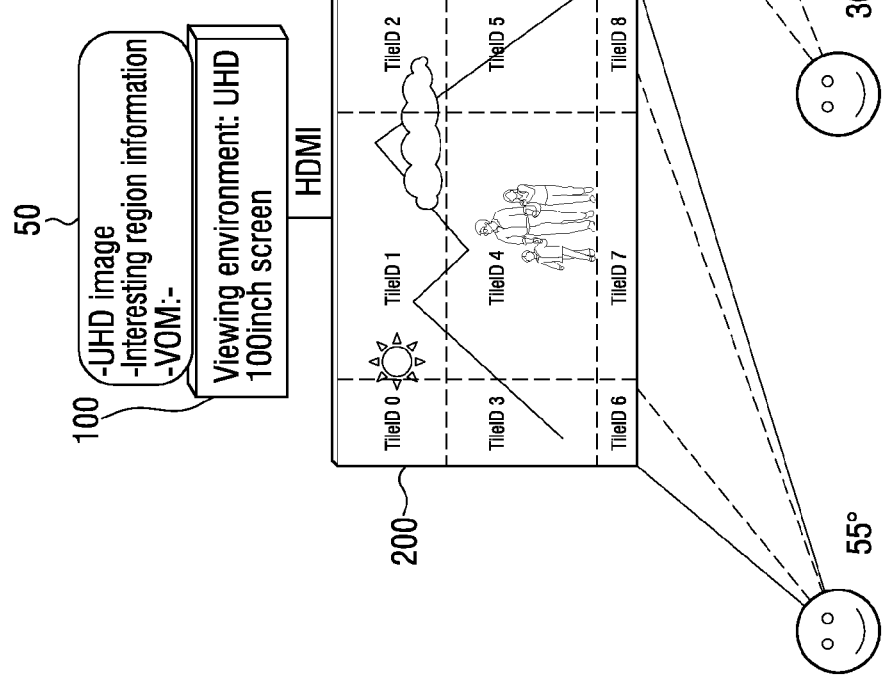

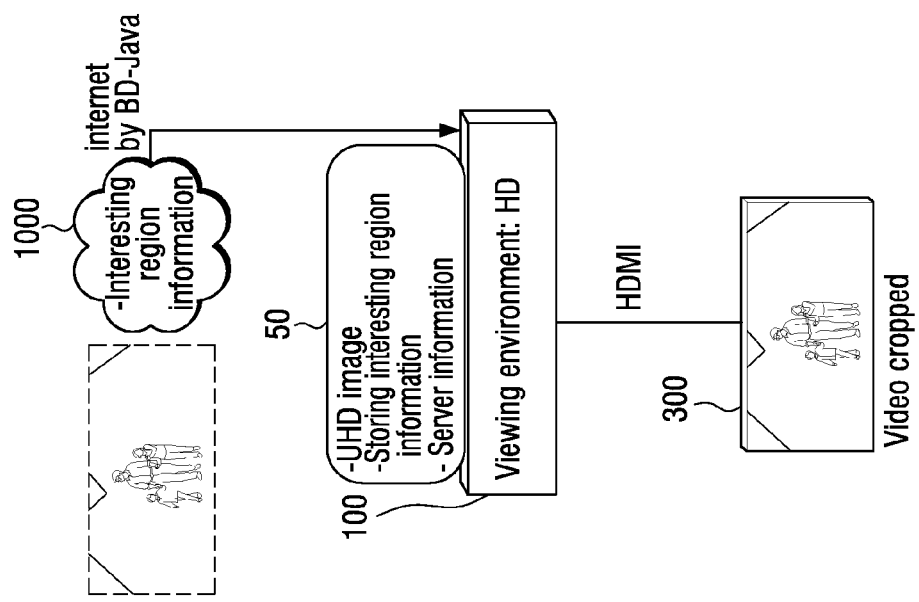
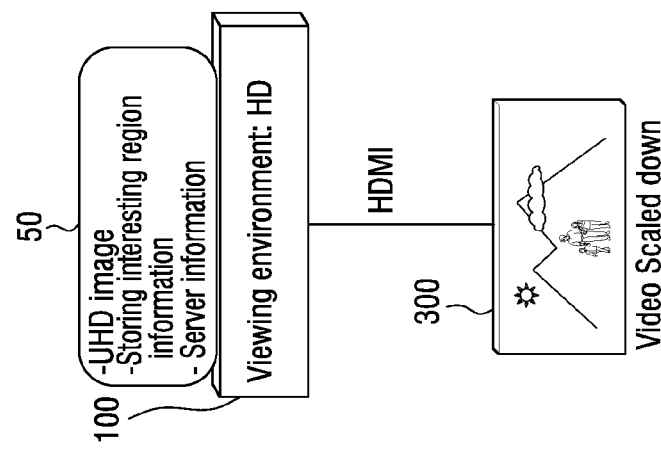
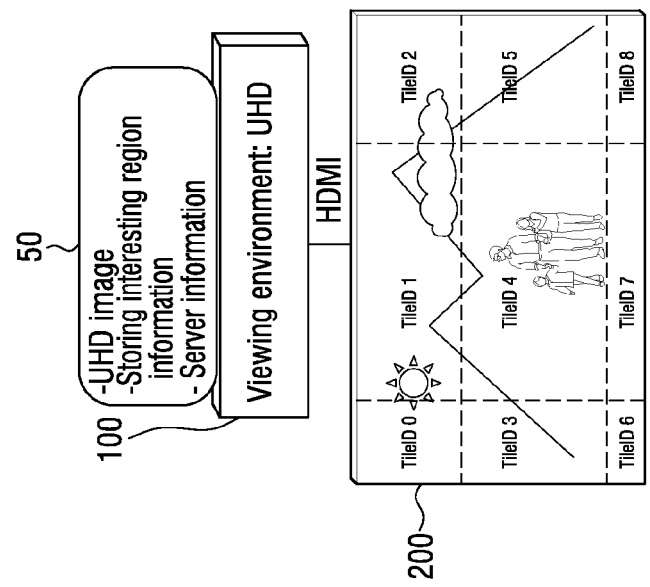

CONTENT PROCESSING APPARATUS FOR PROCESSING HIGH RESOLUTION CONTENT AND CONTENT PROCESSING METHOD THEREOF

PRIORITY

This application claims priority under 35 U.S.C. §119(a) to Korean Patent Application No. 10-2012-0110910 filed on Oct. 5, 2012, in the Korean Intellectual Property Office, the disclosure of which is incorporated herein by reference in its entirety.

BACKGROUND

1. Field

The present disclosure relates to a content processing apparatus and a content processing method, and more particularly to a content processing apparatus for processing high resolution content and a content processing method, which can process an interesting region of the high resolution content in consideration of an output resolution while processing the high resolution content.

2. Description of the Related Art

With the development of electronic technology, various types of display devices have been developed and are now commonly used. For example, a representative display device is a TV.

Recently, as the performance of TVs has become better, high-quality content, such as 3D content or high resolution content, can be displayed on the TVs. As a representative example, with the development of TV technology, UHD (Ultra High Definition) content can now be displayed through a TV.

The UHD content is content having higher definition than full HD content. UHD corresponds to the number of pixels in length and width, which reaches a 4000 (3840×2160) to 8000 (7680×4320) class. Since screen resolution is affected by the number of pixels, 4 k UHD is four times clearer than HD (1920×1080). Further, 8 k UHD is 16 times clearer than HD (1920×1080). The frame rate, that is, the number of frames per second, of HD is 30 Hz, whereas the frame rate of UHD is 60 Hz, which corresponds to the transmission of 60 image frames per second. Accordingly, a much more natural and dynamic screen image can be provided.

Since high resolution content, such as UHD content, has a large number of pixels, the high resolution content should be displayed on a display device having a larger screen. Further, in order for a user to experience the feeling of viewing realistic images through the screen, the image of the screen should come into view as wide as possible. That is, the whole screen should be in the range of a user's viewing angle. Current HD TVs provide a viewing angle of about 30 degrees, and in the case of a UHD TV, a wider viewing angle should be provided.

Although image content manufacturing technology has been developed as described above, a larger number of HD display devices than UHD display devices have actually been used by consumers. In order to display high resolution content, such as UHD content, on a low resolution display device, a video frame should be down-scaled.

FIGS. 1A and 1B illustrate display states where UHD content is displayed on different display devices. As illustrated in FIG. 1A, if the UHD content is displayed on a UHD display device 10, a wide viewing angle (55 degrees) is ensured. By contrast, as illustrated in FIG. 1B, if the UHD content is displayed on an HD display device 20, the viewing angle is narrowed in comparison to the viewing angle of FIG. 1A, and more specifically, is narrowed to approximately 30 degrees.

In order to display the UHD content on the HD display device 20, scaling should be performed so as to make the size of a video frame of the UHD content match the display size of the HD display device 20. Since the UHD image frame is at least 4 times larger than the HD image frame, the down scaling is performed at a scaling rate that is equal to or less than ¼. However, the UHD image is content that is made suitable to view the UHD image with a wide viewing angle, and if the UHD image is excessively reduced, the portion of the UHD image which can be viewed by the user becomes too small. In the case where a person 11 is included in the scene as shown in FIG. 1B, the size of the person 11 is excessively reduced when the image of the person 11 is displayed on the HD display device 20. Accordingly, a user's natural viewing of the content may be disturbed.

SUMMARY

The present disclosure has been made to address at least the above problems and/or disadvantages and to provide at least the advantages described below. Accordingly, an aspect of the present disclosure provides a content processing apparatus and a content processing method thereof, which can process high resolution content so that discrimination of an interesting region can be improved if the interesting region is present in a video frame of the high resolution content.

According to an aspect of an exemplary embodiment, a content processing apparatus includes a driver configured to detect high resolution content when a recording medium having the high resolution content recorded thereon is mounted on the content processing apparatus; a data processor configured to generate video frames by processing the high resolution content; an interface configured to transmit the video frames generated by the data processor to a display device; a storage configured to store display characteristic information of the display device; and a controller configured to determine an interesting region included in a video frame of the high resolution content based on interesting region information in response to the display characteristic information indicating that the display device is a low resolution display device, and configured to control the data processor to generate the interesting region to have a frame size and to replace the video frame of the high resolution content with the generated interesting region.

The video frame that includes the interesting region among video frames of the high resolution content may be divided into a plurality of tile data. The controller may be configured to control the data processor to selectively decode the tile data that corresponds to the interesting region among the plurality of tile data based on the interesting region information and to generate an image having the frame size, as the generated interesting region, based on the decoded tile data.

The interesting region information may be information which designates a position of the interesting region in the video frame of the high resolution content. The controller may be configured to control the data processor to generate the video frames by decoding video data of the high resolution content and to crop an image of a region that is designated by the interesting region information among the generated video frames to thereby enlarge the image such that the image has the frame size.

The interesting region information may be configured to be stored in the recording medium.

The recording medium may be further configured to store type information indicating a type of the high resolution content, information notifying whether the interesting region information is stored in the recording medium, and video output mode information indicating whether permission is granted to change the video frame of the high resolution content using the interesting region.

The controller may be configured to control the data processor to replace at least a part of the video frame of the high resolution content with an image of the interesting region in response to determining that the video output mode information has a first value, and to generate the video frame of the high resolution content as originally configured in response to determining that the video output mode information has a second value.

Further, the content processing apparatus may further include a communicator configured to perform communication with a server device.

The controller may be configured to receive the interesting region information from the server device via the communicator, and store the received interesting region information in the storage.

According to another aspect of an exemplary embodiment, a content processing method which is performed by a content processing apparatus connected to a display device, includes detecting high resolution content including video data when a recording medium having the high resolution content stored thereon is mounted; determining interesting region information of the high resolution content in response to determining that the display device is a low resolution display device; processing data by determining an interesting region in a video frame of the high resolution content based on the interesting region information, generating the interesting region to have a frame size, and replacing the video frame of the high resolution content with the generated interesting region; and providing a plurality of video frames including the generated interesting region to the display device.

The video frame that includes the interesting region among video frames of the high resolution content may be divided into a plurality of tile data.

The processing of the data may include selectively decoding the tile data that corresponds to the interesting region among the plurality of tile data based on the interesting region information; and performing scaling by generating an image having the frame size depending on the decoded tile data.

The interesting region information may be information which designates a position of the interesting region in the video frame of the high resolution content. The processing of the data may include generating the video frames by decoding video data of the high resolution content; and cropping an image of a region that is designated by the interesting region information among the generated video frames to enlarge the image such that the image has the frame size.

The content processing method may further include detecting the interesting region information from the recording medium.

The recording medium may be further configured to store type information indicating a type of the high resolution content, information notifying whether the interesting region information is stored in the recording medium, and video output mode information indicating whether permission is granted to change the video frame using the interesting region.

The processing of the data may replace at least a part of the video frame of the high resolution content with an image of the interesting region in response to determining that the video output mode information has a first value, and generate the video frame of the high resolution content as originally configured in response to determining that the video output mode information has a second value.

Further, the content processing method may further include receiving and storing the interesting region information from a server device.

According to still another aspect of an exemplary embodiment, a non-transitory computer readable recording medium has stored thereon a program which causes a computer to perform a content processing method, wherein the content processing method includes detecting high resolution content including video data from a recording medium having the high resolution content recorded thereon; determining interesting region information of the high resolution content in response to determining that a display resolution of a display device is a low resolution; and processing data by determining an interesting region included in a video frame of the high resolution content according to the interesting region information, generating the interesting region to have a frame size, and replacing the video frame of the high resolution content with the generated interesting region.

According to still another aspect of an exemplary embodiment, a recording medium includes a first storage region in which high resolution content is stored; a second storage region in which type information indicating a type of the high resolution content is stored; a third storage region in which interesting region information indicating an interesting region included in a video frame of the high resolution content is stored; a fourth storage region in which information notifying whether the interesting region information is stored in the recording medium is stored; and a fifth storage region in which video output mode information indicating whether permission is granted to change the video frame of the high resolution content using the interesting region is stored.

According to yet another aspect of an exemplary embodiment, a content processing device includes an interface configured to connect the content processing device to an external display device, a data processor configured to receive and process content and output the processed content as video frames to be displayed on the external display device, and a controller configured to determine characteristic information of the external display device, obtain interesting region information identifying an interesting region of the content, and control the data processor to scale the interesting region according to the characteristic information and output the scaled interesting region as a portion of one of the video frames.

According to the various exemplary embodiments of the present disclosure as described above, even if high resolution content is displayed on a low resolution display device, discrimination of a detailed region in the video frame is prevented from deteriorating.

BRIEF DESCRIPTION OF THE DRAWINGS

The above and other aspects, features and advantages of the present disclosure will be more apparent from the following detailed description when taken in conjunction with the accompanying drawings, in which:

FIGS. 5A-5C are diagrams explaining the operation of the content processing apparatus according to an exemplary embodiment;

FIGS. 10A-10C are diagrams explaining the operation of the content processing apparatus according to the exemplary embodiment of FIG. 9;

DETAILED DESCRIPTION OF EXEMPLARY EMBODIMENTS

Hereinafter, exemplary embodiments are described in detail with reference to the accompanying drawings.

Figure 1A:
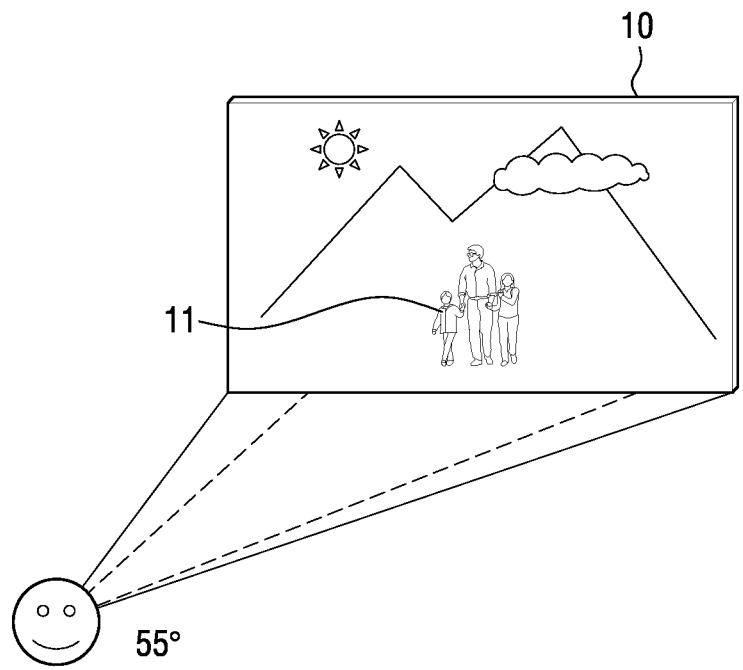
FIGS. 1A and 1B are diagrams explaining problems caused in the related art.
Figure 1B:
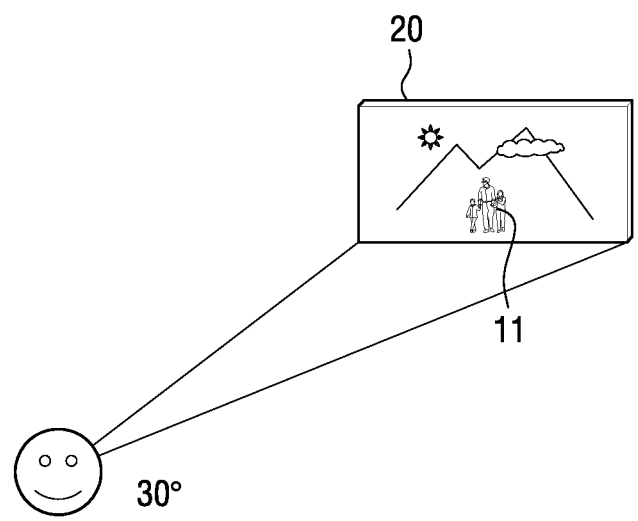
Figure 2:
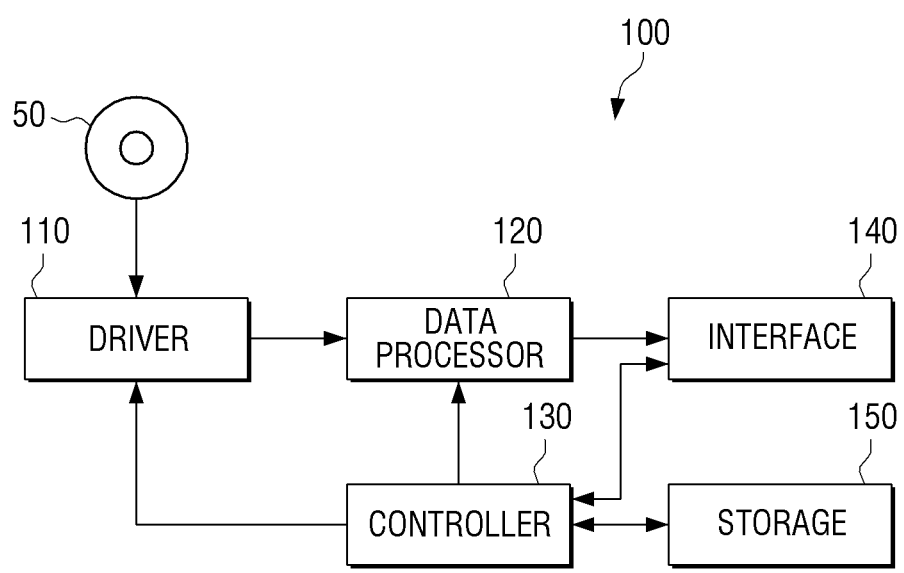
FIG. 2 is a block diagram illustrating the configuration of a content processing apparatus according to an exemplary embodiment.

FIG. 2 is a block diagram illustrating the configuration of a content processing apparatus according to an exemplary embodiment. A content processing apparatus 100 may be implemented in various devices, such as a TV, a PC, a notebook PC, a set top PC, and the like, and may be implemented in the form of a signal processing module mounted on such devices. FIG. 2 shows an example of the configuration of a content processing apparatus implemented in the form of a recording medium reproducing apparatus that can reproduce a recording medium according to an exemplary embodiment.

Referring to FIG. 2, the content processing apparatus 100 includes a driver 110, a data processor 120, a controller 130, an interface 140, and a storage 150.

The driver 110 is a constituent element for detecting data by driving a recording medium when the recording medium is mounted on the driver 110. The recording medium may be one of various types of media, such as an optical disk, a Blu-ray Disk, a hologram disk, a USB memory stick, and an external hard disk drive. In the recording medium, high resolution content may be recorded. Here, the term "high resolution content" may refer to content that has a relatively higher resolution than an output resolution of a display device. For example, the high resolution content may refer to Ultra High Definition (UHD) content, although is not limited thereto. Hereinafter, an exemplary description is provided in which the content processing apparatus 100 can reproduce a Blu-ray Disk 50 in which UHD content is stored.

The driver 110 may read data using a laser for reproducing the disk 50. Specifically, the driver 110 may include a tray on which an optical disk may be placed, a motor which rotates the optical disk, a connector connected to a main board to transmit and receive various kinds of data, a power connector which receives power from a power supply device, an optical pickup unit which records a signal on the optical disk by emitting a laser which reads a reflected signal, an object lens, a DSP (Digital Signal Processor) which controls the overall function of the driver 110, and an FEP (Front End Processor) which controls a laser divergence operation of the optical pickup unit and which analyzes the received signal. The signal detected by the driver 110 is provided to the data processor 120.

The data processor 120 generates video frames by processing the high resolution content detected by the driver 110. The data processor 120 may include a demultiplexer which detects video data, audio data, and additional data from the high resolution content, a video decoder which decodes the video data, a scaler, an audio decoder which decodes the audio data, a filter which filters noises, a signal amplifier which amplifies an audio signal, a data decoder which decodes additional data, a renderer which renders an object depending on the decoded additional data, a mixer, and so on. In the case of the Blu-ray Disk, image data compressed by a codec of various standards, such as, for example, MPEG-2, H.264/MPEG-4 AVC, or VC-1 standards, may be stored. The data processor 120 may generate the video frames by decoding the image data using the codec. In the description of the exemplary embodiments, illustration and description of audio data processing will be omitted.

The interface 140 is a configuration to transmit the video frames or audio signal processed by the data processor to the display device. Specifically, the interface 140 may be implemented by HDMI (High Definition Multimedia Interface).

The storage 150 is a constituent element for storing various types of information, such as, for example, an O/S that is used to operate the content processing apparatus 100, various kinds of programs, and data. The controller 130 may store various kinds of data received from the display device through the interface 140 and various kinds of information and data detected from the disk 50 in the storage 150.

If the recording medium such as a disk is mounted on the driver 110, the controller 130 controls the driver 110 and the data processor 120 to process the high resolution content. The controller 130 determines the characteristics of the display device connected to the interface 140 using display characteristic information stored in the storage 150. The display characteristic information may be acquired according to various exemplary embodiments and stored in the storage 150. As an example, the controller 130 may receive the display characteristic information from the display device through the interface 140. The display characteristic information includes various types of information, such as, for example, output resolution of a display panel provided in the display device, pixel count, a display size, a viewing distance, and a device model name. If the interface 140 is implemented by HDMI as described above, the controller 130 may obtain EDID (Extended Display Identification Data). The controller 130 may estimate whether the currently connected display device is a low resolution display device using a maximum horizontal image size, a maximum vertical image size, and established timing bitmap of the EDID. The display characteristic information may be alternatively referred to as various other types of information, such as, for example, viewing environment information, resolution information, and EDID, and hereinafter, this information is exemplarily referred to as display characteristic information.

As another example, a user may directly input the display characteristic information. Specifically, the content processing apparatus 100 may display a UI (User Interface) that enables a user to provide the output resolution through a touch screen panel provided on the content processing apparatus 100 or through an external display device. The user can input the output resolution, such as UHD or HD, through the UI. The controller 130 stores the display characteristic information in the storage 150. If the display device and the content processing apparatus are connected by a method such as an HDMI connection method, display characteristic information, such as screen size information, is automatically obtained and stored as the viewing environment information. By contrast, if the display characteristic information is unable to be obtained due to an analog connection method or other reasons, a set value which is set during manufacturing or a user setting value may be generated as the viewing environment information and stored in the storage 150.

As described above, the information on the viewing environment of the high resolution content may be stored in the storage 150. The controller 130 determines the characteristics of the display device connected to the interface 140 using the information stored in the storage 150.

As a result of determining the characteristics of the display device connected to the interface 140, if it is determined that the display device is a low resolution display device, the controller 130 controls the data processor 120 to replace at least a part of the video frames of the high resolution content by an interesting region image. In an exemplary embodiment, the term "low resolution" refers to a resolution that is relatively lower than the resolution of the content. If the content is UHD content having a resolution in the range of a 4000 (3840×2160) to 8000 (7680×4320) class, the output resolution of an HD class display device having a resolution of 1920×1080 corresponds to a low resolution. Hereinafter, an example in which the high resolution content is UHD content, and the low resolution display panel or device is a display panel or device having HD resolution, will be described, but the exemplary embodiments are not limited thereto. The exemplary embodiments can also be applied in the same manner in the case where the resolution of the content is higher than the resolution of the display panel or device.

In an exemplary embodiment, the interesting region image refers to an image of a local region in one video frame. That is, the video frame of the UHD content is generated on the basis that the video frame is displayed on the UHD display device that is four times larger than the HD display device. Accordingly, respective detailed image regions included in the whole image are made with a size that can be identified in the user's viewing distance based on the UHD viewing environment. However, in order to display the UHD content on the HD display device, down scaling is performed at a scaling rate of ¼, and thus, the size of the detailed image region is significantly reduced. Accordingly, it is difficult for the user to identify the image region at the same viewing distance, or even if the image region can be identified, it is difficult for the producer of the content to achieve the desired effects of the content on the viewer. For example, in the case of displaying the UHD image on the HD display device, according to the related art, if, for example, people are talking to each other in a scene, although the conversation may correspond to important content, the people may only occupy a small portion of the scene rather than the whole scene. In this case, a viewer is unable to identify various significant details related to the people talking, including, for example, the facial expression of each person or a look in his/her eyes. Accordingly, it is difficult to recognize the feelings that the producer intends to convey.

Accordingly, the content producer may select a portion that the user specially notices as the interesting region among the detailed image regions of the respective video frames. The content producer may further provide interesting region information that indicates the interesting region to the content processing apparatus.

The controller 130 may confirm (e.g., determine) the interesting region included in the video frame of the high resolution content according to the interesting region information, and control the data processor 120 to generate the interesting region with the frame size and to replace the corresponding video frame by the generated interesting region. According to the various exemplary embodiments, the interesting region information may be recorded on the disk 50, may be provided through an external server device, or may be provided using various other methods.

In an exemplary embodiment, cropping information may be provided together with the interesting region information. In an exemplary embodiment, cropping information refers to information that defines a portion to be deleted in consideration of the limits in size of the LCU (Largest Coding Unit). That is, if the interesting region is determined in the LCU in the image frame, an image having the size of 1920×1088 may be extracted from the UHD image. In order to display this image on the display device having the size of 1920×1080, cropping is required. Accordingly, by providing cropping information to indicate the cropping position, an image having an appropriate HD size can be output through the display device. The cropping information may also be provided through the recording medium such as the disk 50 or through an external server device.

According to an exemplary embodiment, the video frame including the interesting region among the video frames of the high resolution content may be divided into a plurality of tiles. The size, position, and shape of the tiles may be adaptively selected to match the size of the interesting region.

The tile is an example of a coding unit in a UHD video encoder.

Figure 3:
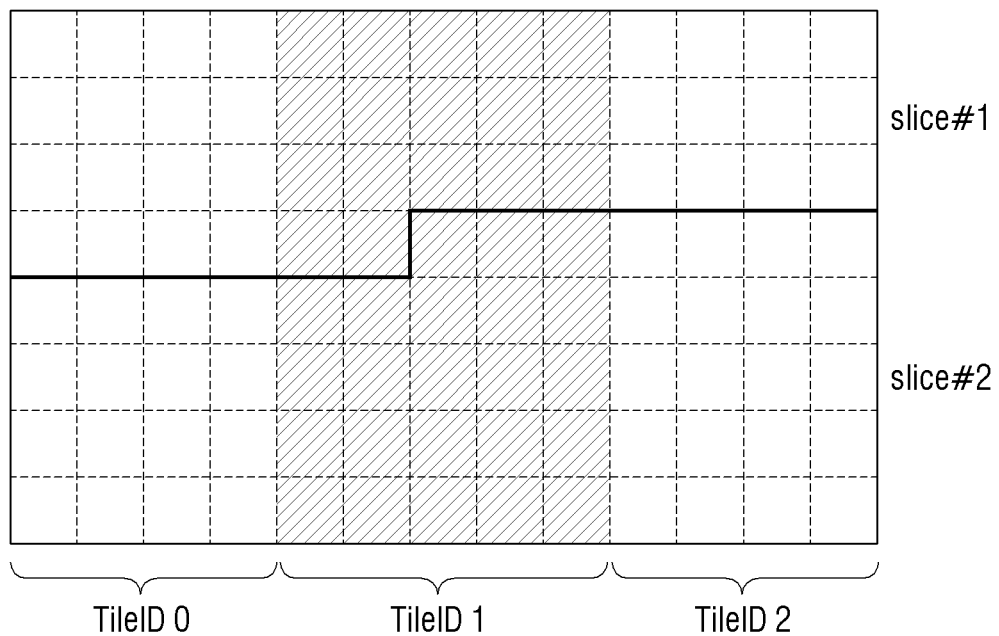
FIG. 3 is a diagram explaining the concept of a tile and a slice according to an exemplary embodiment.

FIG. 3 is a diagram explaining the concept of a slice and a tile of a coding unit in the UHD video encoder according to an exemplary embodiment. In HEVC (High Efficiency Video Coding), which is the next generation video coding standard that is discussed in JCT-VC (Joint Collaborative Team on Video Coding) organized by ISO/IEC MPEG (Moving Picture Experts Group) and ITU-T VCEG (Video Coding Experts Group), the slice and the tile as illustrated in FIG. 3 are defined.

Referring to FIG. 3, one picture, that is, one video frame, is composed of slices including an integer number of coding tree blocks having a consecutive raster scan order and rectangular-shaped tiles including an integer number of coding tree blocks. The coding tree blocks constituting one slice may belong to several tiles. The plurality of tiles that constitute one picture may be simultaneously decoded by a plurality of independent decoders under the condition that filters which improve the picture quality of tile boundaries are not used.

As described above, one video frame may be divided into a plurality of tile data, and each tile data may be independently decoded.

Accordingly, if the interesting region information that designates the tile data corresponding to the interesting region is provided, the controller 130 may control the data processor 120 to selectively decode the tile data that corresponds to the interesting region among the plurality of tile data depending on the interesting region information and to generate an image of the decoded tile data with the frame size.

Figure 4:
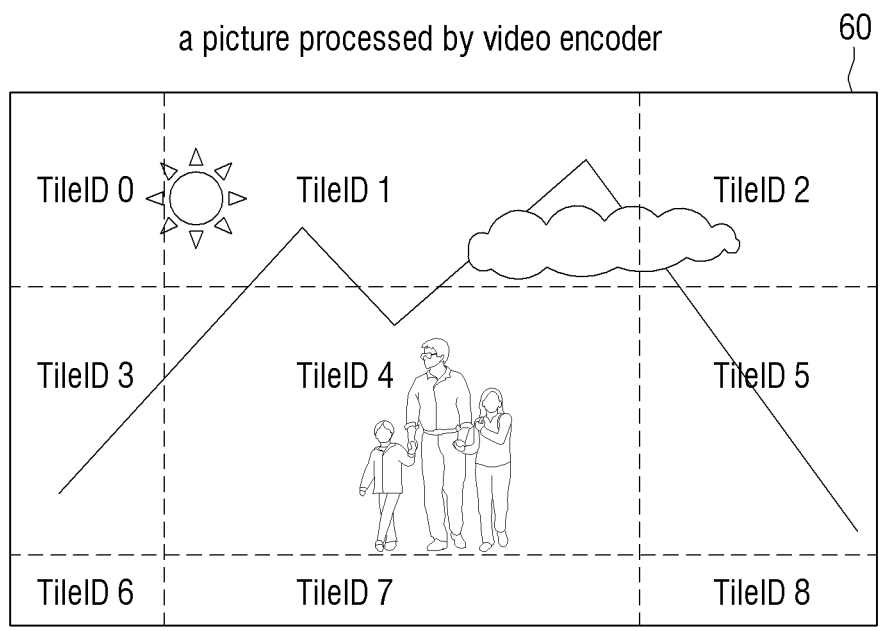
FIG. 4 is a diagram illustrating a video frame that is divided into a plurality of tiles.

FIG. 4 shows a case where the interesting region is expressed as a tile. As illustrated in FIG. 4, one video frame may be divided into a plurality of tiles. Since the tile has the coding tree block as a basic unit and is in a rectangular shape, one screen is divided into 9 tiles in a case where the center of the screen is the interesting region.

Referring to FIG. 4, the whole region of the video frame 60 may be divided into 9 tiles (TileID 0 to 9) in total. If the fifth tile, that is, TileID 4, is designated as the interesting region, the interesting region information may include TileID 4 that is an identifier for designating the corresponding tile. The controller 130 controls the data processor 120 to enlarge the image of the tile that corresponds to TileID 4 with the whole frame size and to replace the corresponding video frame 60 by the image of the enlarged portion of TileID 4.

FIGS. 5A-5C are diagrams explaining the operation of the content processing apparatus according to a first exemplary embodiment.

According to the exemplary embodiment of FIGS. 5A-5C, on a disk (e.g., disk 50), that is, in the recording medium, the interesting region information may be stored together with the high resolution content. According to an example, the high resolution content, type information indicating a type of the high resolution content, notification information notifying whether the interesting region information is present, and video output mode information for permitting whether to change the video frame using the interesting region may be stored on the disk. In addition, information on a caption or captions to be added to the high resolution content or menus may be further included.

High resolution content may refer to the content such as the above-described UHD image. The video data of the high resolution content may include a plurality of tile data.

As described above, the content processing apparatus 100 uses the display characteristic information in order to grasp whether the screen on which the content is to be displayed is a screen for high resolution or a screen for HD. In an exemplary embodiment, the display characteristic information may be considered as information that is necessary for selecting and outputting an object that is suitable to the screen, whereas other types of information, such as, for example, the type information may be information that can be selectively recorded.

The interesting region information is information for specifying the interesting region included in a video frame. According to exemplary embodiments, the interesting region information may have various values. If the video frame is divided into a plurality of tiles and thus a plurality of tile data are included in the video data as in exemplary embodiments disclosed herein, the interesting region information may be information that designates at least one tile data among the tile data. In the case of following the H.264 standard, the interesting region information may be recorded as SEI (Supplemental Enhancement Information) or may be stored as separate navigation information.

The video output mode information is information for determining whether the original picture is replaced by the image of the interesting region or the original picture is output as is. The video output mode information may include a first value that corresponds to "Yes" and a second value that corresponds to "No". The video output mode information may be determined by the intention of the content producer. For example, a certain producer may not want the content processing apparatus 100 to change a video frame based on the content and the viewing environment. Considering this, it may be necessary to provide a control mechanism that prevents the content producing apparatus 100 from changing the video frame, and the video output mode information may serve as such a control mechanism to perform such a control operation.

As described above, various pieces of information may be stored on the disk 50. If the disk 50 is mounted, the controller 130 grasps the viewing environment of the display device connected to the content processing apparatus 100 using the display characteristic information stored in the storage 150.

FIG. 5A shows a case where a UHD display device 200 is connected. In this case, the controller 130 provides the original video frames by decoding the video data of the high resolution content as is (e.g., without scaling). Accordingly, on the UHD display device 200, the original video frames of the high resolution content are displayed.

FIGS. 5B and 5C show the cases where an HD display device 300 is connected. If it is determined that the HD display device 300 is connected, the controller 130 performs down scaling of the video frames of the high resolution content to match the display size of the HD display device 300. Then, the controller 130 determines the video output mode information.

If the video output mode information is determined to have the value of "No" as the result of the determination, the controller 130 performs down scaling of the video frames of the high definition content depending on the display size of the HD display device 300. Accordingly, as shown in FIG. 5B, the original video frames in a reduced state are displayed.

By contrast, if the video output mode information is determined to have the value of "Yes" as the result of the determination, the controller 130 then determines the above-described notification information among the information detected by the driver 110. Accordingly, the controller 130 determines whether the interesting region information is included. If the interesting region information is not included, the controller 130 generates the plurality of video frames by processing the video data of the high resolution content, and then provides the video frames to the display device through the interface 140. By contrast, if the interesting region information is included, the controller 130 controls the data processor 120 to selectively process the tile data designated by the interesting region information and to generate the tile data with the video frame size. Accordingly, as illustrated in FIG. 5C, an image that corresponds to TileID 4 is displayed on the HD display device 300 with the frame size.

Through the above-described process, the user can view the important portion with a discriminative size even in a viewing environment where video frames of high resolution content are generally reduced in size and displayed to match the display size.

In the above-described exemplary embodiments, since the type information is optional information that can be selectively recorded, the content producer may not record the type information of the content. In the case where the content producer does not record the type information of the content, the controller 130 may determine the type (e.g., kind) of the content based on the information that reflects the characteristics of the display device, and perform the above-described operation.

Figure 6:
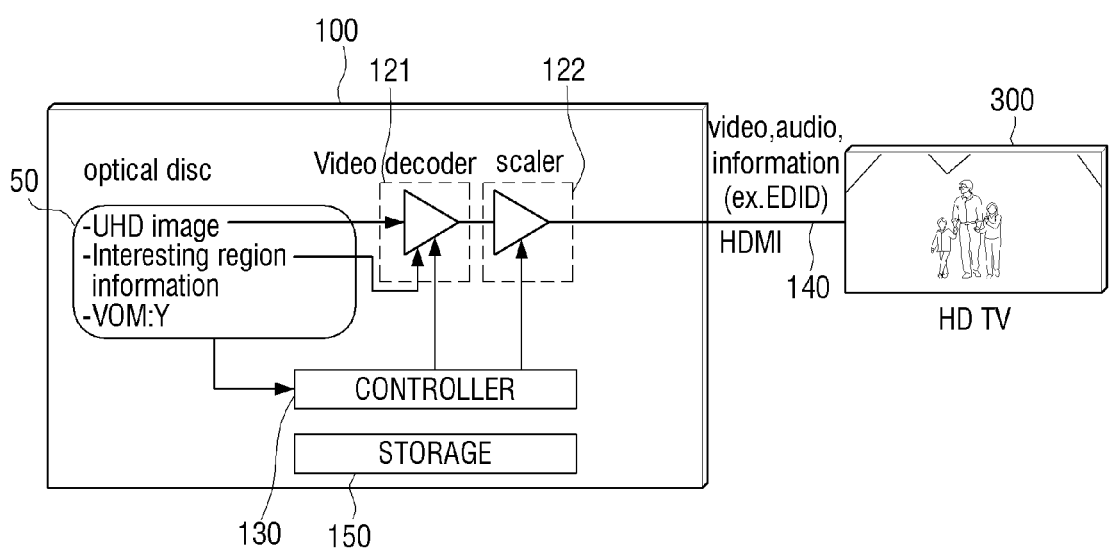
FIG. 6 is a diagram illustrating the detailed configuration of the content processing apparatus according to the exemplary embodiment of FIG. 5.

FIG. 6 is a diagram illustrating the configuration of the content processing apparatus according to the above-described exemplary embodiment. Referring to FIG. 6, the data processor 120 of the content processing apparatus 100 includes a video decoder 121 and a scaler 122.

The video decoder 121 is configured to decode the video data of the high resolution content stored on the disk 50.

Once the disk 50 is mounted on the driver 110, the controller 130 detects various kinds of data stored on the disk 50 by driving the driver 110. The controller 130 compares information on the viewing environment of the display device 300 stored on the storage 150 with the type information stored on the disk 50. As the result of comparison, if it is determined that the high resolution content is stored on the disk 50, but the viewing environment corresponds to low resolution, the controller 130 controls the operation of the video decoder 121 based on the interesting region information and the video output mode information stored on the disk 50.

In the above-described exemplary embodiment, the video frame including the interesting region may be divided into a plurality of tiles. In this case, a bit stream of the video frame may be divided into a plurality of tile data units.

If the video output mode information has the value of "Yes", the controller 130 controls the video decoder 121 to selectively decode only the tile data designated by the interesting region information. By contrast, if the video frame does not include the interesting region information or the video output mode information has the value of "No", the controller 130 controls the video decoder 121 to decode the overall data of the corresponding video frame.

The scaler 122 configures the video frame using the data decoded by the video decoder 121. As a result, the video frame that includes the interesting region is replaced by the interesting region image generated with the frame size, and the video frame that does not include the interesting region is down-scaled to match the display size of the HD display device 300. The video frame scaled by the scaler 122 is transmitted to the display device 300. Although not illustrated in FIG. 6, if graphic objects, such as captions or menus, are present, a constituent element, such as a mixer for mixing the graphic objects with the video frame, may be further included and used to mix the graphic objects with the video frame.

If a portion desired to be emphasized, that is, the interesting region, is present in a specific video frame, the content producer may divide the corresponding video frame into a plurality of tiles depending on the position, the size, and the shape of the interesting region. For example, if the interesting region is in the center region of the video frame, the video frame may be divided into 9 tiles in total as illustrated in FIG. 4.

Figure 7:
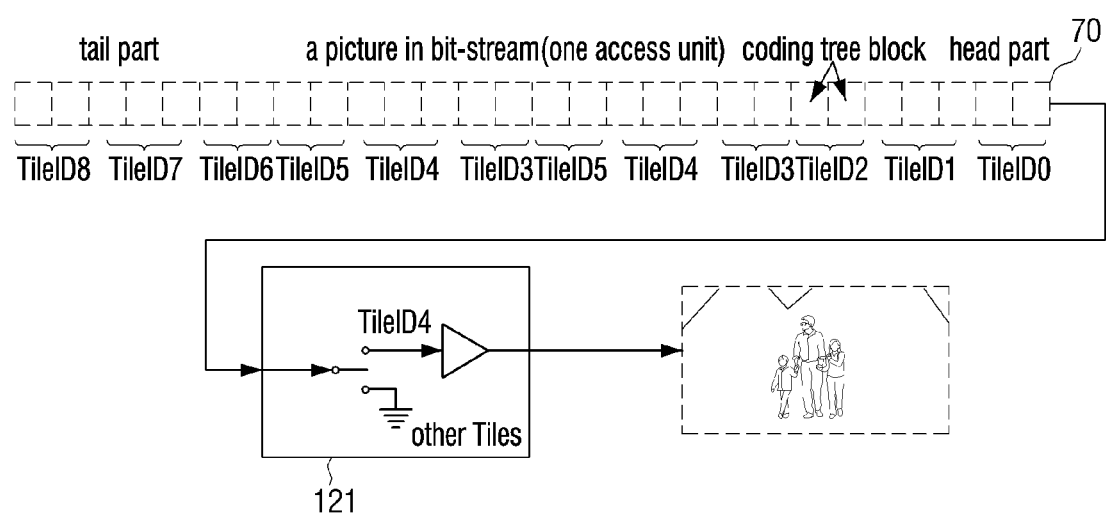
FIG. 7 is a diagram illustrating the configuration of a bit stream of content according to the exemplary embodiment of FIG. 5.

FIG. 7 illustrates a bit stream for expressing a picture that is composed of one slice and 9 tiles according to an exemplary embodiment. The content producer divides the video frame that includes the interesting region, that is, the picture, into a plurality of tile data to be encoded. For encoding, an HEVC encoder may be used. Since HEVC syntax expresses coding tree blocks in the slice in a raster scan order, the bit stream is made in the order as illustrated in FIG. 7. That is, the 0-th to eighth tile data are sequentially arranged in the order that is from a head part which is firstly input to the video decoder to a tail part which is lastly input. In FIG. 7, each of TileID 0, 2, 6, and 8 corresponds to two coding tree blocks, each of TileID 3 and 5 corresponds to four coding tree blocks, each of TileID 1 and 7 corresponds to three coding tree blocks, and TileID 4 corresponds to 6 coding tree blocks.

If TileID 4 is designated by the interesting region information, the video decoder 121 performs decoding by selectively detecting the corresponding tile data TileID 4, but does not decode the remaining tile data. The scaler 122 generates an image of the frame size by scaling the decoded tile data.

As described above, the content processing apparatus according to exemplary embodiments may decode only a part of the specific video frame to be processed. In this case, a process of dividing and encoding the plurality of tile data is required in the encoding process.

According to another exemplary embodiment, the content processing apparatus can extract the interesting region from the data that is not divided in the encoding process to display the extracted interesting region.

Figure 8:
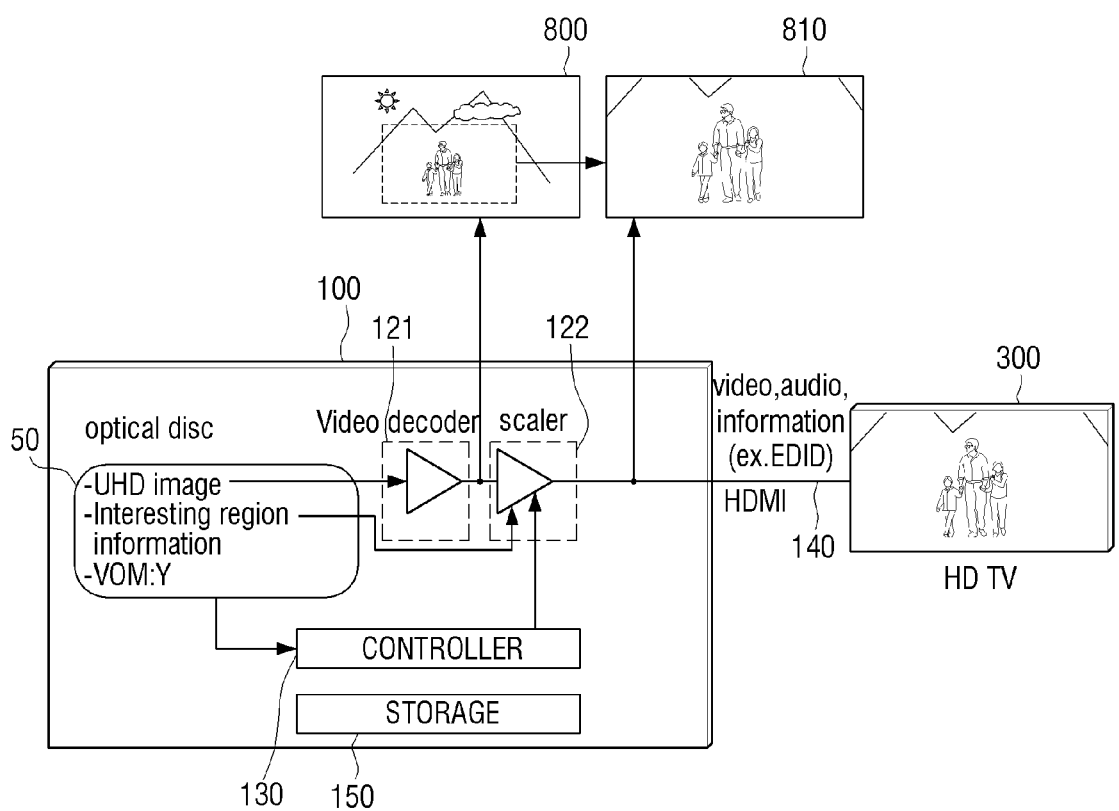
FIG. 8 is a diagram explaining the operation of a content processing apparatus according to another exemplary embodiment.

FIG. 8 is a diagram explaining the operation of a content processing apparatus according to a second exemplary embodiment. In the second exemplary embodiment, on the recording medium (e.g., on the disk 50), high resolution content in which a video frame is not divided into tile units or a video frame is configured as one tile, type information, notification information notifying whether the interesting region is present, interesting region information, and video output mode information may be stored. Here, the interesting region information includes information for designating the position of the interesting region in the video frame of the high resolution content. For example, if the interesting region is designated in a rectangular shape, the interesting region information may include a pixel coordinate value, width, and height information of one corner among four corners of a rectangle.

If the disk 50 is mounted and loaded, the controller 130 controls the data processor 120 to generate the video frame by decoding the video data thereof, crop a region of the video frame that is specified by the interesting region information, and enlarge the cropped image region with the video frame size.

For example, if the left upper corner is set as a reference point, and its coordinate value (x, y), width=w, and height=h are set, the controller 130 recognizes a rectangle having pixel coordinates (x, y), (x+w, y), (x, y+h), and (x+w, y+h) as its corners as the interesting region. The controller 130 controls the scaler 122 to perform scaling by cropping an image of the portion that is recognized as the interesting region after the video frame is generated depending on the video data decoded by the video decoder 121. Accordingly, on the HD display device 300, a cropped image, that is, the interesting region image, rather than the original video frame, is displayed.

Referring to FIG. 8, an image 810 of a partial region in the whole video frame 800 is enlarged with the frame size to be output.

In the above-described exemplary embodiments, it has been exemplarily described that the interesting region information is stored in the recording medium and is provided to the content processing apparatus 100. However, the interesting region information may be provided according to other types of methods as well. That is, the interesting region information may be provided through a separately provided server device which may be connected to the content processing apparatus 100 in many different ways, e.g., over the Internet, etc.

Figure 9:
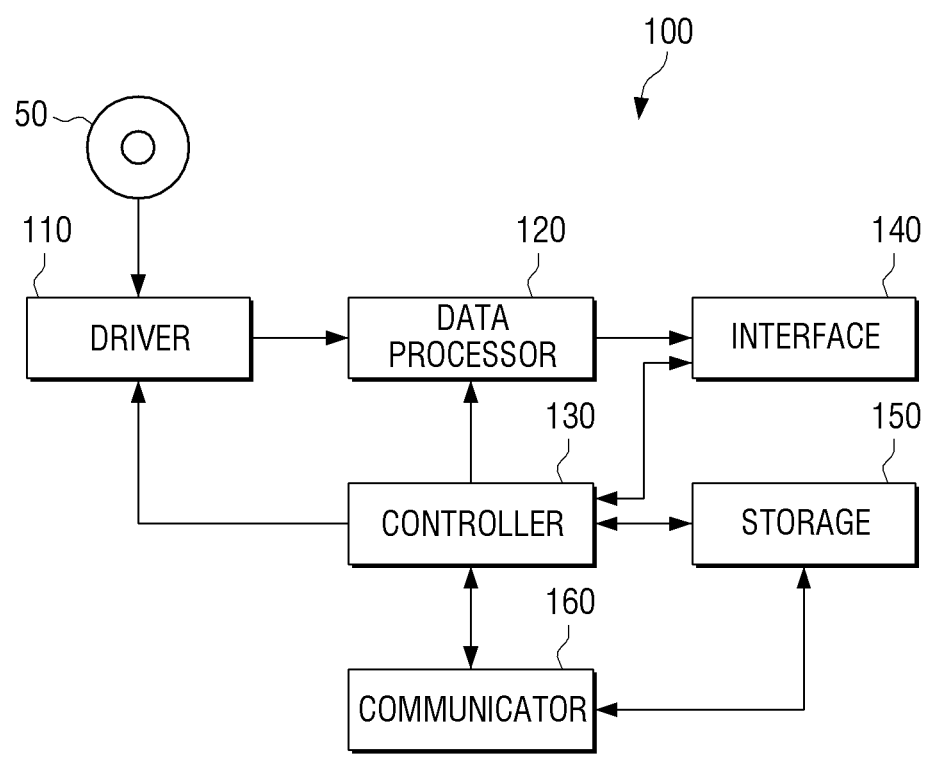
FIG. 9 is a block diagram illustrating the configuration of a content processing apparatus according to still another exemplary embodiment.

FIG. 9 is a block diagram illustrating the configuration of a content processing apparatus according to still another exemplary embodiment. Referring to FIG. 9, the content processing apparatus 100 includes a driver 110, a data processor 120, a controller 130, an interface 140, a storage 150, and a communicator 160.

According to the third exemplary embodiment shown in FIG. 9, on the recording medium, that is, on the disk 50, address information related to a server device that can provide the interest region information may be stored, for example, address information identifying an address of the server device.

In an exemplary embodiment, address information refers to address information of a server device that provides objects for low resolution. As the address information, information, such as a Uniform Resource Locator (URL) or an Internet Protocol (IP) address of the server device, a server name, and the like, may be stored in the form of an identifier or a JAVA program. Typically, the point in time when a movie is released using an optical disk type recording medium may be a relatively short period of time after the movie has been shown in theatres, e.g., less than one month after the movie has been shown in theaters. It may be difficult to determine the interesting region or interesting regions in such a short time, and even if the interesting region has been determined, the interesting region may be added or modified later. Accordingly, after the optical disk is first released, the interesting region information may be provided using the server device to dynamically add or modify the interesting region information.

If the address information is detected by the driver 110, the controller 130 controls the communicator 160 to access the server device using the detected address information.

The communicator 160 is a constituent element that performs communication with the external server device using the address information stored on the disk 50. The communicator 160 may access the server device using various different types of technologies, such as, for example, Wi-Fi, IEEE, Bluetooth, or LAN. The server device may be a server device that is operated by a content producer, a content processing apparatus producer, and/or a display device producer. The controller 130 receives the interesting region information from the server device through the communicator 160, and stores the received interesting region information in the storage 150. The interesting region information may include information on a reference coordinate value for designating the interesting region, a width, and a height as described in the second exemplary embodiment.

The controller 130 controls the data processor 120 to crop the interesting region image using the interesting region information stored in the storage 150 and enlarge the cropped interesting region image of the video frame with the appropriate frame size. The video frame generated from the data processor 120 is provided to the external display device through the interface 140 to be displayed thereon.

FIGS. 10A-10C are diagrams explaining the operation of the content processing apparatus according to the exemplary embodiment of FIG. 9. As illustrated in FIG. 10A, if the UHD display device 200 is connected, the content processing apparatus 100 provides the video frame by decoding the UHD image data as is. Accordingly, the UHD display device 200 displays the original video frame as is.

By contrast, as illustrated in FIGS. 10B and 10C, if the HD display device 300 is connected, the content processing apparatus 100 may determine whether to perform cropping depending on the video output mode information. FIG. 10B shows the case where the video output mode information indicates the value of "No". According to FIG. 10B, the content processing apparatus 100 provides the original video frame as is even if the HD display device 300 is connected.

FIG. 10C shows the case where the video output mode information indicates the value of "Yes". According to FIG. 10C, the content processing apparatus 100 receives the interesting region information by accessing the server device 1000. The content processing apparatus 100 crops and outputs a partial region depending on the received interesting region information.

Figure 11:
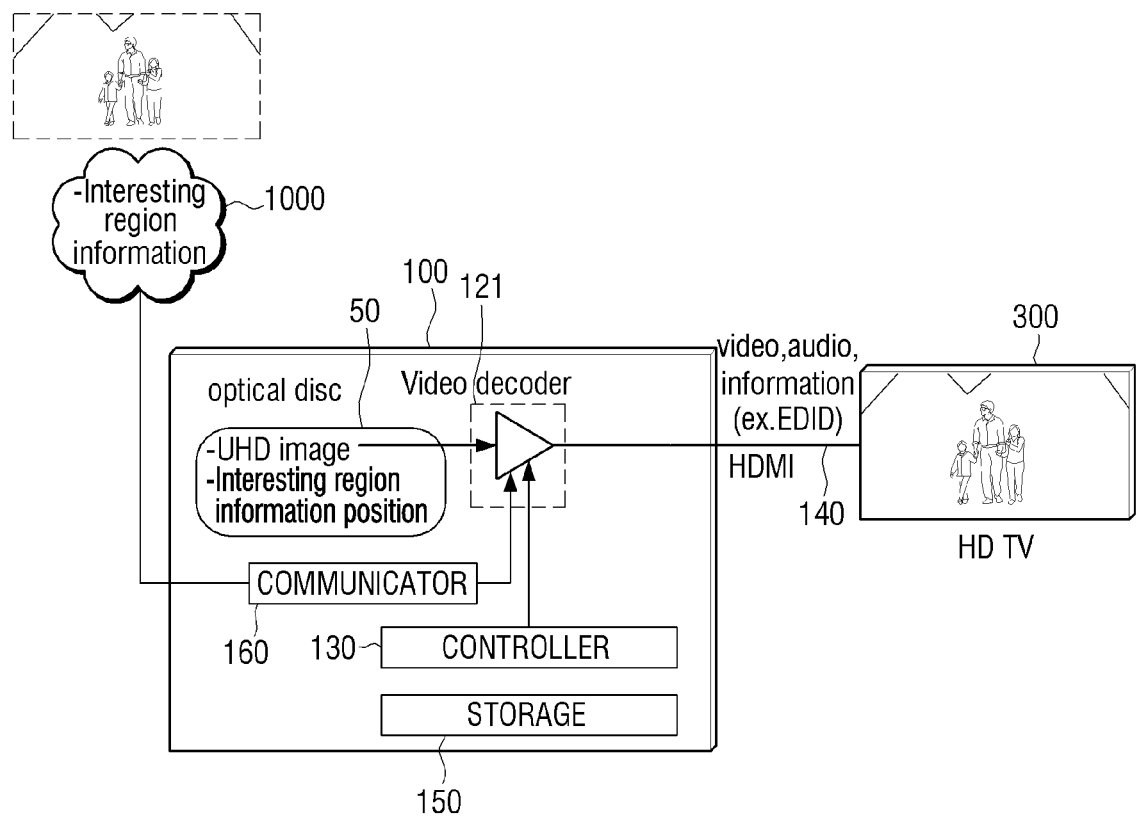
FIG. 11 is a diagram illustrating the detailed configuration of the content processing apparatus according to the exemplary embodiment of FIG. 9.

FIG. 11 is a diagram illustrating the internal configuration and operation of the content processing apparatus according to the exemplary embodiment of FIG. 10. Referring to FIG. 11, the communicator 160 of the content processing apparatus 100 receives the interesting region information from the server device 1000 using an interesting region information position, that is, address information, stored on the disk 50. The received interesting region information is provided to the video decoder 121. The video decoder 121 performs cropping of the interesting region image with respect to the video frame including the interesting region based on the interesting region information. The cropped interesting region image is enlarged with the appropriate frame size and is provided to the HD display device 300.

In the above-described exemplary embodiments, the content processing apparatus 100 is an apparatus that reproduces content stored on the recording medium. However, according to other exemplary embodiments, the content processing apparatus 100 may be implemented in the form of a signal receiving apparatus that receives and processes a signal including the high resolution content through a broadcasting network or other communication networks.

Figure 12:
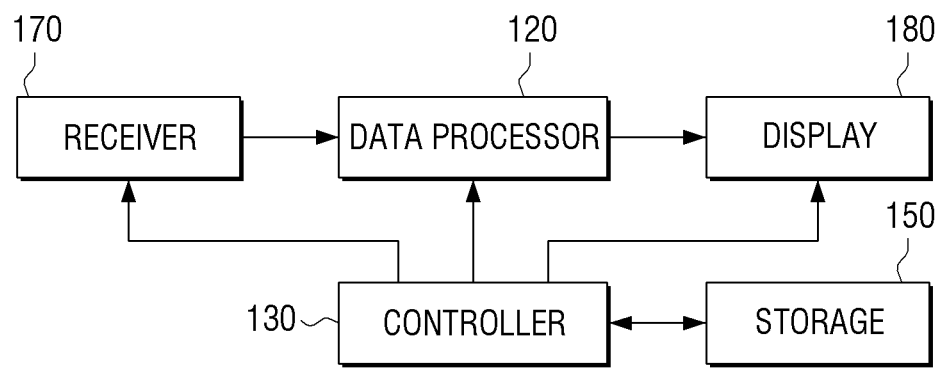
FIG. 12 is a block diagram illustrating the configuration of a content processing apparatus implemented in the form of a display device according to an exemplary embodiment.

FIG. 12 is a block diagram illustrating the configuration of a content processing apparatus implemented in the form of a broadcasting receiving apparatus according to an exemplary embodiment. Referring to FIG. 12, the content processing apparatus 100 includes a receiver 170, a data processor 120, a display 180, a controller 130, and a storage 150. The same reference numerals are used for the same constituent elements as those described according to other exemplary embodiments, and a detailed description thereof will be omitted.

The receiver 170 may have a different configuration depending on the broadcasting communication standards adopted in the country where the content processing apparatus is used. At present, there are various digital broadcasting standards, such as ATSC (Advanced Television System Committee), DVB (Digital Video Broadcasting), and ISDB-T (Integrated Services Digital Broadcasting-Terrestrial). In the case where the ATSC standard is adopted, the receiver 170 may include an antenna, an RF down converter, a demodulator, and an equalizer.

The receiver 170 receives a signal that includes the high resolution content through a broadcasting network and transfers the high resolution content to the data processor 120.

The data processor 120 may include a demultiplexer, an RS decoder, and a deinterleaver. Since the detailed configuration for signal transmission and reception for each broadcasting standard is disclosed in detail in the standard documents of the respective broadcasting standards, a detailed illustration and description thereof will be omitted.

The display 180 is provided with a display panel. The characteristics of the display panel are stored in the storage 150. Accordingly, in this exemplary embodiment, the controller 130 can immediately determine the characteristics of the display panel provided in an external device using the information recorded in the storage 150 without needing to determine the viewing environment. In the case of a display panel for low resolution, if it is determined that the high resolution content is received through the receiver 170, the controller 130 controls the data processor 120 to perform operations according to the above-described various exemplary embodiments. Accordingly, the video frames of the high resolution content are down-scaled to match the display size to be displayed, and the video frame including the interesting region among the video frames is replaced by the image of the interesting region to be displayed.

The display 180 displays the video frames to which objects for low resolution are added through a display panel. The display 180 may further include a backlight unit or other driving circuits in addition to the display panel. Since these are known devices which may be implemented in many different ways, a detailed illustration and description thereof will be omitted.

In the case where high resolution content is provided through a broadcasting network as shown in FIG. 12, various additional information, such as the interesting region information, notification information, and video output mode information, may be recorded in various fields in the broadcasting signal to be transmitted. For example, the information may be provided through a TVCT (Terrestrial Virtual Channel Table), an EIT (Event Information Table), a PMT (Program Map Table), and a metadata stream.

Figure 13:
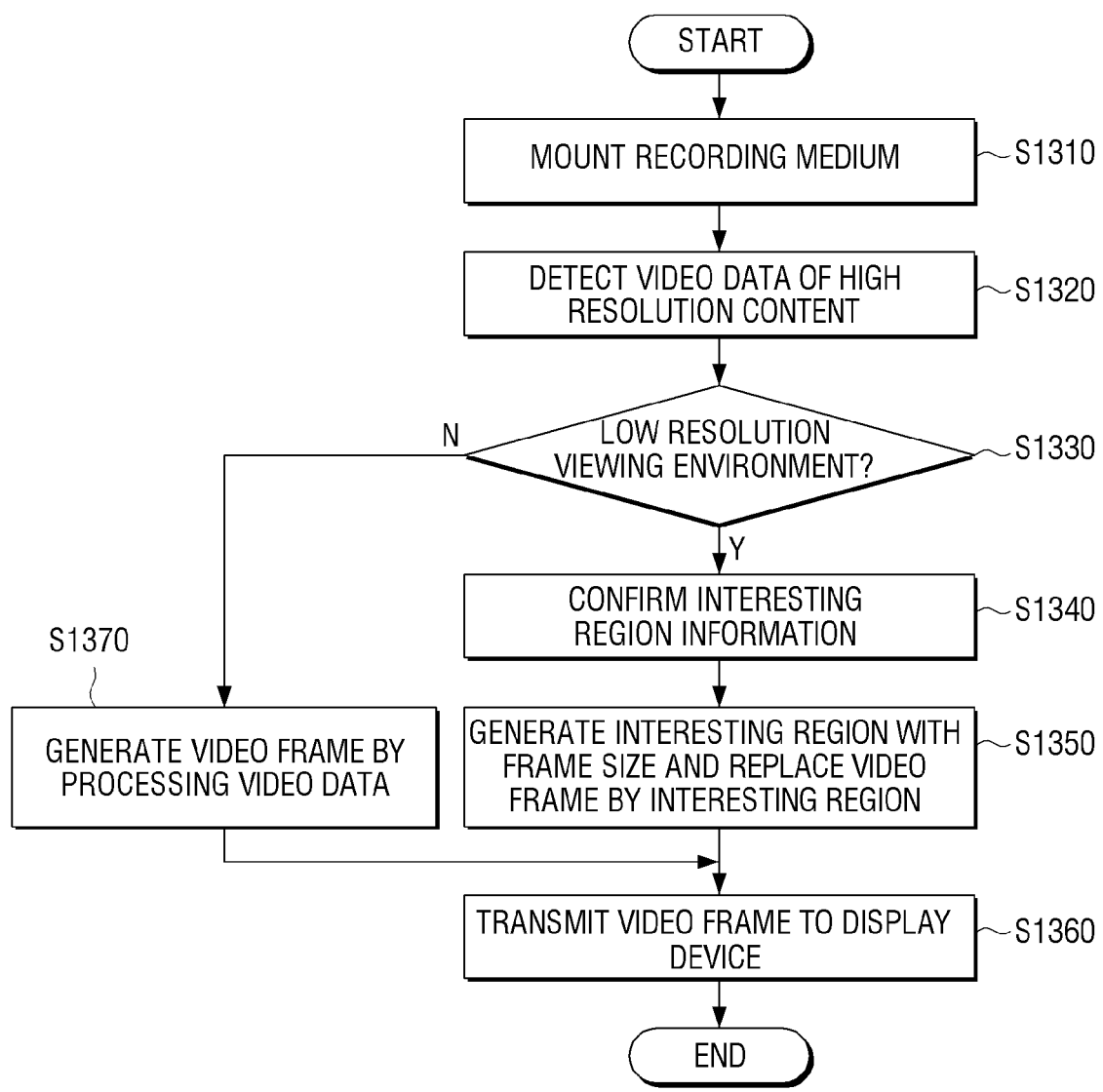
FIG. 13 is a flowchart illustrating a content processing method according to an exemplary embodiment.

FIG. 13 is a flowchart illustrating a content processing method according to an exemplary embodiment. Referring to FIG. 13, a recording medium is mounted at operation S1310, and video data of high resolution content recorded on the recording medium is detected at operation S1320.

The content processing apparatus determines the viewing environment of the high resolution content at operation S1330. If the viewing environment is determined to be a low resolution viewing environment at operation S1330, the content processing apparatus determines the interesting region information at operation S1340, and replaces the video frame including the interesting region by the interesting region image at operation S1350. For convenience in explanation, the operation of generating the video frames may be called a data processing operation.

If the bit stream of the video data is divided into a plurality of tile data as in the first exemplary embodiment described above, the interesting region information may include identification of the tile that corresponds to the interesting region. In this case, the data processing operation may include a decoding operation of selectively decoding only the corresponding tile data and a scaling operation of generating an image according to the decoded data with the frame size.

Further, the interesting region information may be information that directly designates the coordinates of the region. In this case, the data processing operation may include acquiring the interesting region image by cropping the designated coordinate region after decoding all the data of the entire group of video frames. The interesting region information may be recorded on the recording medium itself or may be input from an external server device or the like.

Accordingly, at least a part of the video frame that is transmitted to the display device may be replaced by the interesting region image to be transmitted to the display device at operation S1360.

On the other hand, if it is determined at operation S1330 that the viewing environment is not a low resolution viewing environment, the video data of the high resolution content is processed as is, and video frames are generated at operation S1370. The generated video frames are then provided to the display device at operation S1360.

Referring to FIG. 13, a method that is performed by the content processing apparatus implemented in the form of a recording medium reproducing apparatus has been described. However, according to other exemplary embodiments, the method may be performed by a content processing apparatus which is implemented in the form of a broadcast receiving apparatus such as a TV, as described above.

In the above-described exemplary embodiments, the disk is used as an example of a recording medium. Specifically, a recording medium that can store the UHD content, such as a Blu-ray Disk or a hologram disk, may be used. On this recording medium, various pieces of information as described above may be recorded according to the exemplary embodiments.

The storage region of the recording medium (e.g., disk 50) may be divided into a plurality of storage regions depending on the kind of recorded information. For example, the recording medium may include a first storage region in which high resolution content is stored, a second storage region in which type information indicating the type of the high resolution content is stored, a third storage region in which interesting region information indicating the interesting region included in the video frame of the high resolution content is stored, a fourth storage region in which information for notifying whether the interesting region information is present is stored, and a fifth storage region in which the video output mode information which indicates whether permission is granted to change the video frame using the interesting region is stored.

If the interesting region information is provided from the external server device as described above, a sixth storage region in which the address information of the server device is stored may be included instead of the fourth and fifth storage regions. It is understood that the storage medium is not limited to being configured as described above, and that many different combinations of storage regions within the storage medium may be implemented.

Figure 14:
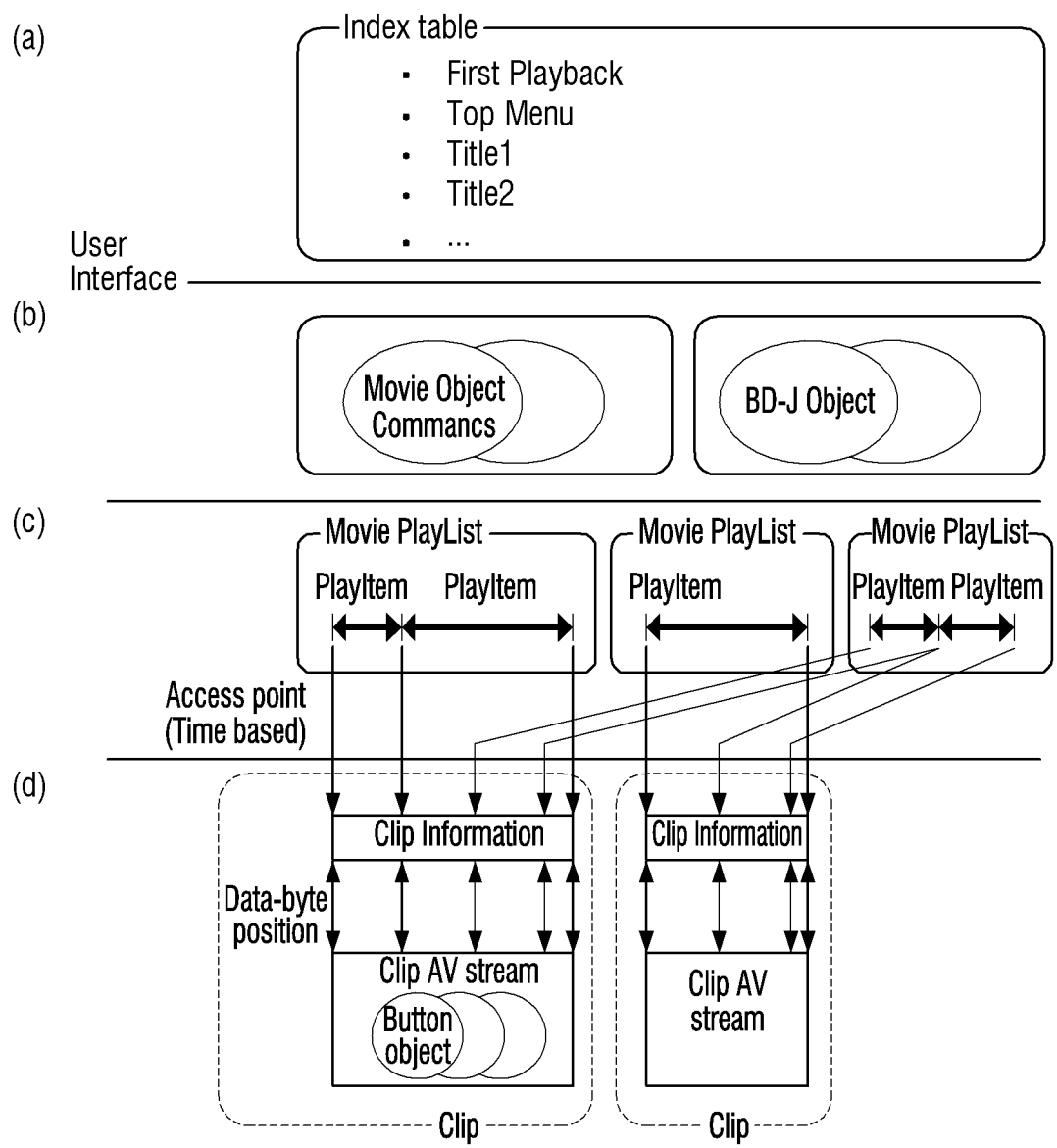
FIG. 14 is a diagram illustrating an example of the configuration of a recording medium according to an exemplary embodiment.

FIG. 14 is a diagram illustrating an example of the configuration of a recording medium according to an exemplary embodiment. Specifically, FIG. 14 shows a data structure of a BD-ROM disk that stores content, such as a movie.

As illustrated in FIG. 14, the BD-ROM disk is composed of four layers, including an index table (a), a movie object/BD-J object (b), a playlist (c), and a clip (d).

The clip (d) includes a clip AV stream file that is a video stream file, and a clip information file that is an attribute file in the form of a database related to the file.

The playlist (c) is an information structure that indicates which order the bit streams used during the reproduction of the content are reproduced in, and includes a plurality of play items. Typically, the playlist forms content, such as a movie or a drama, and the play item forms one chapter of the content. The play item of the playlist indicates a video stream, an audio stream, a caption stream, and a menu stream to be reproduced, and specifically indicates which stream ID (or stream number) and which stream attribute each of the streams has. For example, in the case of a video, a video format, a frame rate, and a caption are indicated, and in the case of audio, a stream attribute such as a language code is indicated.

Various additional information, such as the type information, interesting region information, notification information, and video output mode information, that are stored in the recording medium according to the above-described exemplary embodiments, are recorded in appropriate positions in the recording medium depending on the attribute.

The above-described various content processing methods may be coded and provided in the form of a program. Such a program may be recorded on a non-transitory readable medium.

As one example, a program which causes a device to perform a content processing method, which includes detecting video data of high resolution content from a recording medium recorded with high resolution content, confirming interesting region information of the high resolution content if a display resolution is a low resolution, processing data by determining an interesting region included in a video frame of the high resolution content according to the interesting region information, generating the interesting region with a frame size, and replacing the corresponding video frame by the generated interesting region, and providing the entire group of video frames that include the replaced video frame to the display device, may be recorded on the non-transitory readable medium to be executed by the device.

In a device on which the non-transitory readable medium recorded with such a program is mounted, the above-described various content processing methods according to exemplary embodiments may be performed.

According to exemplary embodiments, a non-transitory computer readable medium refers to a device-readable medium which does not store data for a short time, such as a register, a cache, and a memory, but instead semi-permanently stores the data. Specifically, the above-described various applications or programs may be provided and stored in a non-transitory computer readable medium, such as a CD, a DVD, a hard disk, a Blu-ray Disk, a USB, a memory card, and a ROM. It is understood, however, that the non-transitory computer readable medium may alternatively store data for a short period of time (e.g., by being implemented as a register, cache, memory, etc.) according to other exemplary embodiments.

While the present disclosure has been shown and described with reference to certain exemplary embodiments thereof, it will be understood by those skilled in the art that various changes in form and detail may be made therein without departing from the spirit and scope of the present disclosure, as defined by the appended claims.

What is claimed is:

1. A content processing apparatus comprising:
   a driver configured to detect high resolution content when a recording medium having the high resolution content recorded thereon is mounted on the content processing apparatus;
   a data processor configured to generate video frames by processing the high resolution content;
   an interface configured to transmit the video frames generated by the data processor to a display device;
   a storage configured to store display characteristic information of the display device; and
   a controller configured to determine an interest region included in a video frame of the high resolution content based on interest region information in response to the display characteristic information indicating that the display device is a low resolution display device, and configured to control the data processor to generate the interest region to have a frame size and to replace the video frame of the high resolution content with the generated interest region according to video output mode information, stored on the recording medium, indicating whether permission is granted to change the video frame of the high resolution content using the interest region.

2. The content processing apparatus as claimed in claim 1, wherein the video frame that includes the interest region among video frames of the high resolution content is divided into a plurality of tile data, and
   the controller is configured to control the data processor to selectively decode the tile data that corresponds to the interest region among the plurality of tile data based on the interest region information and to generate an image having the frame size, as the generated interest region, based on the decoded tile data.

3. The content processing apparatus as claimed in claim 1, wherein the interest region information is information which designates a position of the interest region in the video frame of the high resolution content, and
   the controller is configured to control the data processor to generate the video frames by decoding video data of the high resolution content and to crop an image of a region that is designated by the interest region information among the generated video frames to thereby enlarge the image such that the image has the frame size.

4. The content processing apparatus as claimed in claim 1, wherein the interest region information is configured to be stored in the recording medium.

5. The content processing apparatus as claimed in claim 4, wherein the recording medium is further configured to store type information indicating a type of the high resolution content, and information notifying whether the interest region information is stored in the recording medium.

6. The content processing apparatus as claimed in claim 5, wherein the controller is configured to control the data processor to replace at least a part of the video frame of the high resolution content with an image of the interest region in response to determining that the video output mode information has a first value, and to generate the video frame of the high resolution content as originally configured in response to determining that the video output mode information has a second value.

7. The content processing apparatus as claimed in claim 1, further comprising a communicator configured to perform communication with a server device,
   wherein the controller is configured to receive the interest region information from the server device via the communicator, and store the received interest region information in the storage.

8. A content processing method to be performed by a content processing apparatus connected to a display device, the content processing method comprising:
   detecting high resolution content comprising video data when a recording medium having the high resolution content stored thereon is mounted;
   determining interest region information of the high resolution content in response to determining that the display device is a low resolution display device;
   processing data by determining an interest region in a video frame of the high resolution content based on the interest region information, generating the interest region to have a frame size, and replacing the video frame of the high resolution content with the generated interest region according to video output mode information, stored on the recording medium, indicating whether permission is granted to change the video frame of the high resolution content using the interest region; and
   providing a plurality of video frames including the generated interest region to the display device.

9. The content processing method as claimed in claim 8, wherein the video frame that includes the interest region among video frames of the high resolution content is divided into a plurality of tile data, and
   the processing of the data comprises:
   selectively decoding the tile data that corresponds to the interest region among the plurality of tile data based on the interest region information; and
   performing scaling by generating an image having the frame size based on the decoded tile data.

10. The content processing method as claimed in claim 8, wherein the interest region information is information which designates a position of the interest region in the video frame of the high resolution content, and
   the processing of the data comprises:
   generating the video frames by decoding video data of the high resolution content; and
   cropping an image of a region that is designated by the interest region information among the generated video frames to enlarge the image such that the image has the frame size.

11. The content processing method as claimed in claim 8, further comprising detecting the interest region information from the recording medium.

12. The content processing method as claimed in claim 11, wherein the recording medium is further configured to store type information indicating a type of the high resolution content, and information notifying whether the interest region information is stored in the recording medium.

13. The content processing method as claimed in claim 12, wherein the processing of the data replaces at least a part of the video frame of the high resolution content with an image of the interest region in response to determining that the video output mode information has a first value, and generates the video frame of the high resolution content as originally configured in response to determining that the video output mode information has a second value.

14. The content processing method as claimed in claim 8, further comprising receiving and storing the interest region information from a server device.

15. A non-transitory computer readable recording medium having stored thereon a program which causes a computer to perform a content processing method,
wherein the content processing method comprises:
   detecting high resolution content comprising video data from a recording medium having the high resolution content recorded thereon;
   determining interest region information of the high resolution content in response to determining that a display resolution of a display device is a low resolution; and
   processing data by determining an interest region included in a video frame of the high resolution content according to the interest region information, generating the interest region to have a frame size, and replacing the video frame of the high resolution content with the generated interest region according to video output mode information, stored on the recording medium, indicating whether permission is granted to change the video frame of the high resolution content using the interest region.

16. A non-transitory computer readable recording medium comprising:
   a first storage region in which high resolution content is stored;
   a second storage region in which type information indicating a type of the high resolution content is stored;
   a third storage region in which interest region information indicating an interest region included in a video frame of the high resolution content is stored;
   a fourth storage region in which information notifying whether the interest region information is stored in the recording medium is stored; and
   a fifth storage region in which video output mode information indicating whether permission is granted to change the video frame of the high resolution content using the interest region is stored.

17. A content processing device, comprising:
   an interface configured to connect the content processing device to an external display device;
   a data processor configured to receive and process content and output the processed content as video frames to be displayed on the external display device; and
   a controller configured to determine characteristic information of the external display device, obtain interest region information identifying an interest region of the content, and control the data processor to scale the interest region according to the characteristic information and output the scaled interest region as a portion of one of the video frames according to video output mode information indicating whether permission is granted to scale the interest region according to the characteristic information.

18. The content processing device of claim 17, wherein:
   the content is configured to be displayed as video frames by a display device according to a first standard, and
   the controller is configured to control the data processor to scale the interest region to be larger than other regions of the content in response to determining that the external display device displays video frames according to a second standard which is a lower resolution than the first standard.

19. The content processing device of claim 18, wherein the first standard is Ultra High Definition (UHD), and the second standard is High Definition (HD).

20. The content processing device of claim 17, wherein the interface comprises a High Definition Multimedia Interface (HDMI).

* * * * *